(No Model.)
A. McDOWELL.
HEEL CUTTER.
No. 518,043.  Patented Apr. 10, 1894.
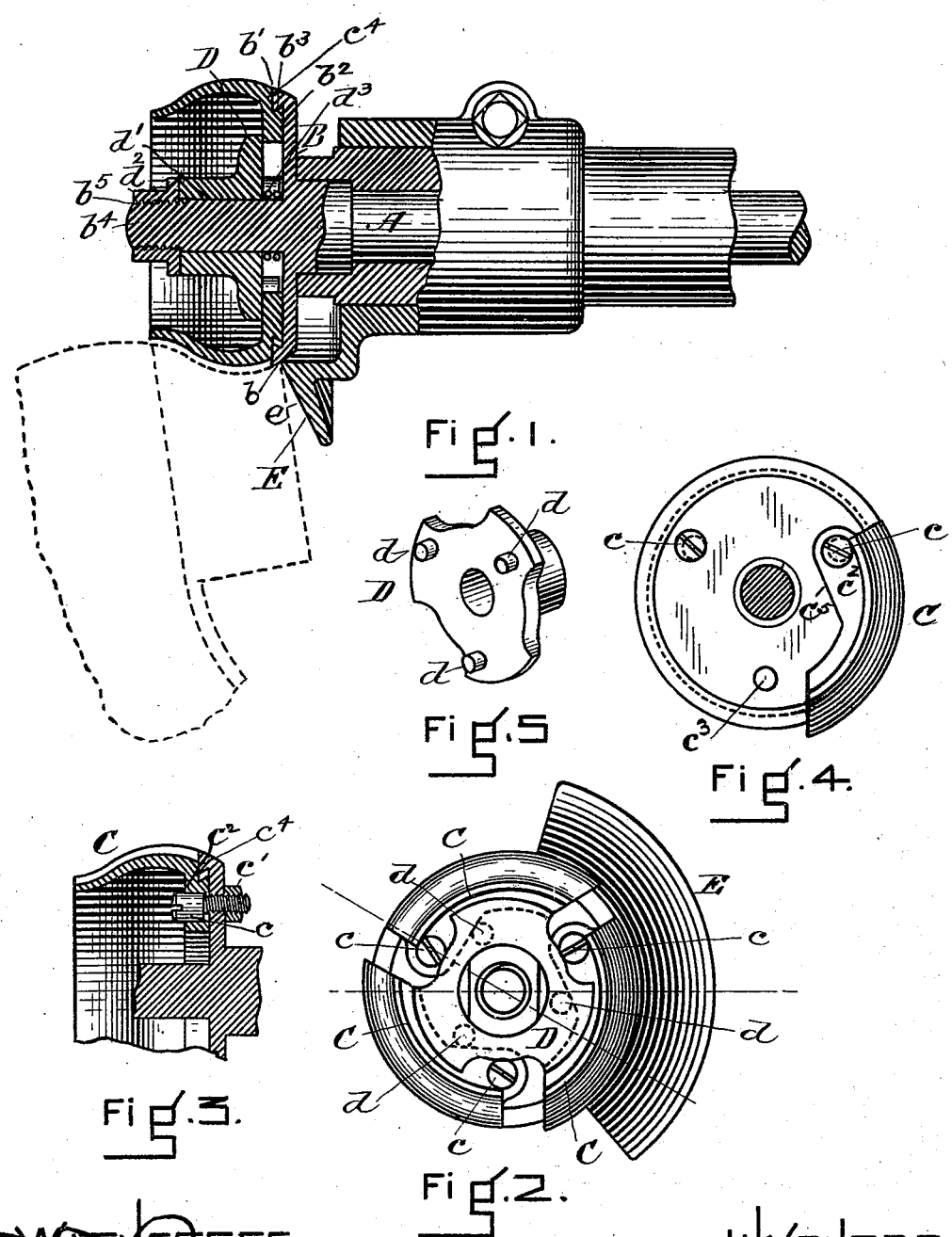

UNITED STATES PATENT OFFICE.

ALEXANDER McDOWELL, OF LYNN, MASSACHUSETTS.

HEEL-CUTTER.

SPECIFICATION forming part of Letters Patent No. 518,043, dated April 10, 1894.

Application filed January 3, 1893. Serial No. 457,074. (No model.)

*To all whom it may concern:*

Be it known that I, ALEXANDER McDOWELL, a citizen of the United States, and a resident of Lynn, in the county of Essex, in the State of Massachusetts, have invented a new and useful Improvement in Heel-Cutters, of which the following is a full, clear, and exact description, reference being had to the accompanying drawings, forming a part of this specification, in explaining its nature.

The invention relates to rotary cutters adapted to trim heel seats and heels, and it comprises various features of construction and organization, all of which will hereinafter be fully described.

In the drawings: Figure 1 is a view in section of the cutter. Fig. 2 is a view in elevation thereof. Figs. 3, 4 and 5 are detail views.

The invention consists of a disk at the outer end of a rotary shaft having in its face a shallow recess, the outer edge of which is under cut in the form of a dove-tail to interlock with a dove-tail section of the cutters.

The cutters may be two or three in number, and they are secured in the recess of the disk by eccentric studs or screws, which permit a change in the position or rake of the cutting edge of each cutter; and they are held locked in place against the face plate, and with their dovetail sections interlocking with the dovetail of the plate by means of positioning and holding pins carried by a clamp plate. This clamp plate is adapted to be turned upon a spindle to move its pins into contact with eccentric surfaces upon the cutter to force or move them outwardly, and is also arranged to bear upon inward extending flanges of the cutters to press and hold them firmly against the face plate. This clamping plate is locked to the face plate by a stud and locking screw. Between the face plate and the clamp plate is a spring which acts to move the clamp plate outward upon its spindle when its holding nut is released, to thereby enable the cutters to be more readily adjusted. The outer edge of the disk is preferably beveled or inclined, to make its outer diameter the largest, and when used for a heel trimmer a stationary gage plate against which the tread of the top lift bears is arranged to extend upon this inclined edge of the face plate, the section of the edge of the face plate extending beyond the gage plate, acting as a rest for the edge of the top lift.

Referring to the drawings, A is a shaft or spindle with which the plate B is interlocked, or to which it is secured. The outer edge $b$ of this plate is preferably inclined from its front corner $b'$. In the face of the plate is a shallow circular recess $b^2$ ending in the dovetail under cut $b^3$. There extends forward from the face a shaft, stud or spindle $b^4$, having the threaded end $b^5$.

In the plate B are studs $c$. These studs preferably are eccentric to the holes in the plate which hold them, and they are adapted to be turned in said holes to any desired position, and are locked in such position by the locking nuts $c'$ upon the back side of said plates. (See Fig. 3.) These studs serve as the pivots for the cutter C. Each blade has a foot $c^2$ at right angles to the main cutting section, which rests against the face of the plate B; and there is in this foot at its rear end a hole $c^3$ of a size to take the eccentric pin or stud. The outer edge of this foot has the dovetail extension $c^4$ which interlocks into the dovetail recess $b^3$ of the plate B. Upon the inner edge of the foot is the eccentric surface $c^5$, against which a pin, stud, or projection $d$ bears in locking the cutter in place with its dove-tail $c^4$ interlocked with the dovetail $b^3$ of the plate B. These locking pins or projections $d$ are upon the inner side of a clamp plate D, which has a central hole $d'$ to fit the spindle end $b^4$. The outer edge of this clamp plate bears upon the feet $c^2$ of the cutter and serves to clamp them firmly against the face of the plate B, the clamp plate being locked in position by the nut $d^2$.

A spring $d^3$ is interposed between the plate B and the clamp plate, and serves to press the clamp plate outward when the nut is released. In locking the cutters in place the clamp plate is put on the spindle and its positioning pins brought into contact with the eccentric surface $c^5$ of the cutters, forcing them outward and interlocking them with the plate, and the clamp plate is then locked in position by the locking nut.

The forward part of the inclined edge $b$ of the plate B is used as an edge gage, against which the edge of the top lift of the heel rests, when the cutter is employed as a heel trimmer, and the tread surface of the top lift will then be sustained by the tread rest E, which is stationary and attached to a fixed part of a machine, and has the inclined surface e.

Having thus fully described my invention, I claim and desire to secure by Letters Patent of the United States—

1. In a sole and heel cutter of the character specified the combination of a face plate having two surfaces, the outer one of which overhangs the inner one with cutting blades having the feet $c^2$ at right angles to the main cutting sections and within them, and having surfaces which bear against the two surfaces of the face plate and extend under the overhanging part of the outer section, and devices for locking the cutter to the plate in this position, as and for the purposes described.

2. In a cutter of the character specified, the combination of the face plate having the circular recess $b^2$ in its face and the overhanging section $b^3$, with the cutters C having the feet $c^2$ and the underlapping extensions $c^4$, and the shaft A having the spindle end $b^4$ and the clamp plate D held upon the said spindle end against the feet of the cutters by a nut $b^2$, as and for the purposes described.

3. The cutter having a face plate and a shoulder, cutting blades, pivoted at their rear ends to the face plate and having shoulders to contact with the shoulder of the face plate, and a clamp plate for clamping said cutters to the face plate having locking pins or projections to engage said cutters and maintain their shoulders in contact with the shoulder or the plate, as and for the purposes described.

4. In a cutter of the character specified, comprising a face plate having a number of cutters C having the feet $c$ attached thereto by pivots passing through the ends of said feet into the face plate, and said pivots, the cutting-plate feet-engaging sections of which are eccentric to the portions held in the plate, as and for the purposes described.

ALEXANDER McDOWELL.

In presence of—
J. M. DOLAN,
M. LYNCH.